(12) United States Patent
Williams

(10) Patent No.: US 7,485,045 B2
(45) Date of Patent: Feb. 3, 2009

(54) BONDED DRIVE SHAFT

(76) Inventor: Mark Williams, 765 Pierce Ave., Louisville, CO (US) 80027

( * ) Notice: Subject to any disclaimer, the term of this patent is extended or adjusted under 35 U.S.C. 154(b) by 42 days.

(21) Appl. No.: 11/029,333

(22) Filed: Jan. 6, 2005

(65) Prior Publication Data
US 2005/0153783 A1   Jul. 14, 2005

Related U.S. Application Data

(60) Provisional application No. 60/534,362, filed on Jan. 6, 2004.

(51) Int. Cl.
F16C 3/02 (2006.01)
(52) U.S. Cl. .................. 464/181; 464/182
(58) Field of Classification Search ........... 464/181, 464/182, 183; 403/268
See application file for complete search history.

(56) References Cited

U.S. PATENT DOCUMENTS 5,087,147 A * 2/1992 Petrzelka et al. ............ 403/268
5,309,620 A * 5/1994 Shinohara et al. .......... 464/181 X
5,601,494 A * 2/1997 Duggan ..................... 464/182
5,632,685 A * 5/1997 Myers ..................... 403/268 X
2003/0068194 A1* 4/2003 Sugiyama et al. ........... 403/268

FOREIGN PATENT DOCUMENTS

JP    5-60123   *  3/1993   .............. 464/181

* cited by examiner

Primary Examiner—Greg Binda
(74) Attorney, Agent, or Firm—Timothy J. Klima

(57) ABSTRACT

A bonded drive shaft includes an elongated tube having an internal bore and at least one end fitting for connecting to a drive component. The end fitting includes first and second locating portions that engage the internal bore to precisely and firmly locate the end fitting with respect to the tube. The end fitting also includes an adhesive gap portion positioned between the locating portions to form a generally annular adhesive receiving gap between the first locating portion, the second locating portion, the adhesive gap portion and the internal bore of the elongated tube. Adhesive is injected into the adhesive receiving gap to bond the end fitting to the elongated tube.

21 Claims, 3 Drawing Sheets

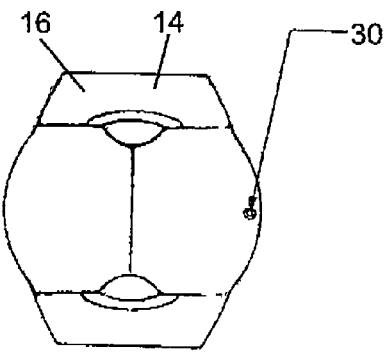
FIG. 3
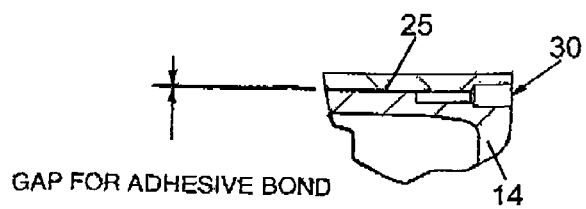
DETAIL B
FIG. 4
FIG. 5
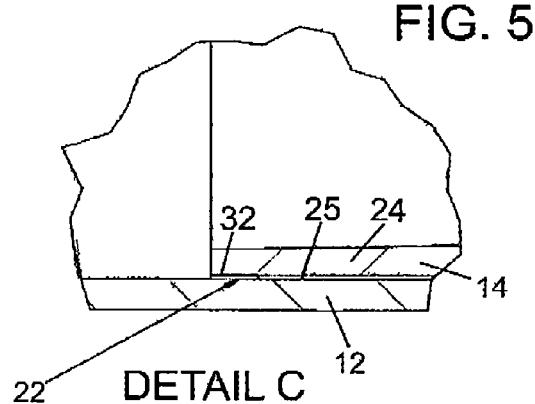
DETAIL C
FIG. 6
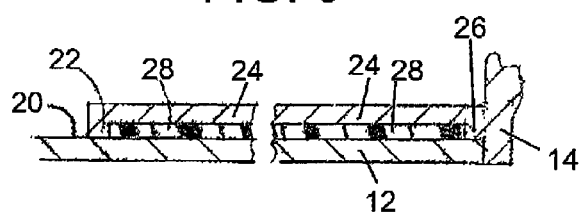
FIG. 7
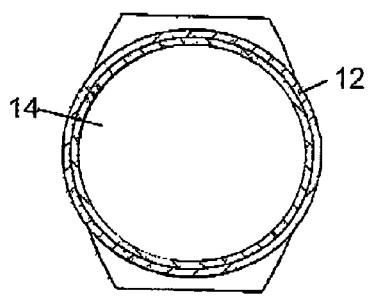
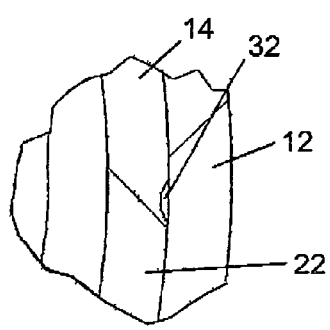
FIG. 8

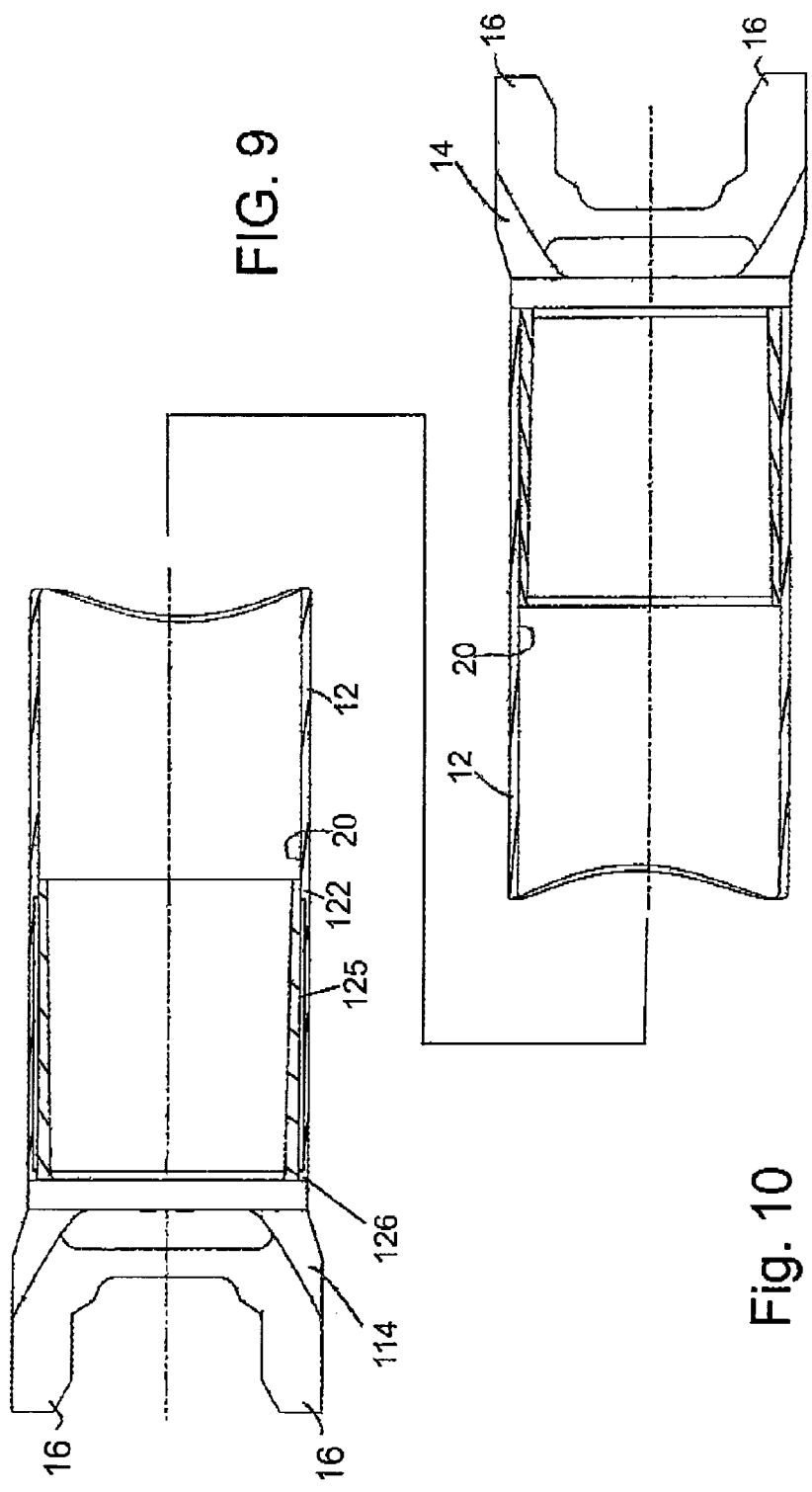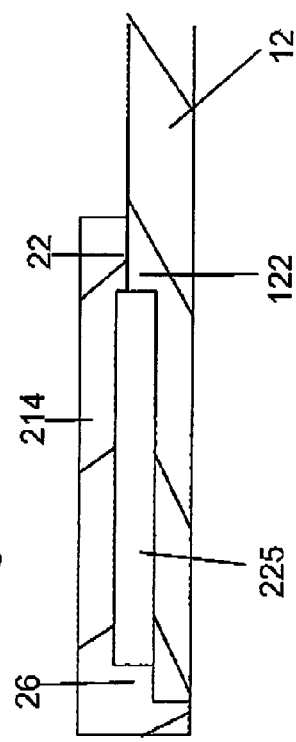

BONDED DRIVE SHAFT

This application claims priority to U.S. patent application Ser. No. 60/534,362 of Mark Williams, filed Jan. 6, 2004, the entire contents of which are incorporated by reference herein.

BACKGROUND

Automotive drive shafts are typically constructed by welding a tubular member to end fittings that include universal joints for connection to drive and driven connection devices for the transmission of power. Aluminum materials are presently used for such components for weight reduction and performance advantages, with the tubular members being welded to the end fittings. The welding methods used to connect such components have several disadvantages:

1. Drive shaft strength is limited because only lower strength weldable alloys can be used for the sub-component tubular members and end fittings.
2. The heat treated aluminum tube is annealed by the heat used in the weld zone, diminishing the effect of the heat treatment and the strength of the tube.
3. Distortion and the stress forces created by the heating and cooling of the weld joint are difficult to control.
4. Welding induced mechanical run out can require excessive balancing weight and straightening operations.
5. Welding of Duralcan Metal Matrix Composite Aluminum is difficult and the quality of the welds is inconsistent.

It is also known to adhesively bond end fittings to carbon fiber tubes, but in the past this has been accomplished by brushing adhesive onto the end fitting and/or tube prior to assembling the end fitting onto the tube, then inserting the end fitting into the tube. This has been found to be wasteful of adhesive, as excess adhesive is used to assure proper bonding when the components are assembled. Further, because there is little ability to control flow of the applied adhesive as the components are assembled, there is no certainty that maximum surface contact between the components and the adhesive is achieved to maximize the bond strength. Finally, because there is such little ability to control the flow and positioning of the adhesive, the balance of the drive shaft can be negatively affected by a non-uniform positioning of the adhesive around the drive shaft.

SUMMARY OF THE INVENTION

The present invention includes a method for bonding an end fitting to a drive shaft tube, without the use of welding. The present invention also includes the bonded drive shaft.

The method of the present invention of manufacturing a bonded drive shaft includes providing an elongated tube having an internal bore and providing at least one end fitting. The end fitting includes a portion for connecting to a drive component and an elongated tubular portion. The elongated tubular portion includes a first locating portion distant from the connecting portion, a second locating portion proximal to the connecting portion and an adhesive gap portion positioned between the first locating portion and the second locating portion. The elongated tubular portion is positioned in the internal bore of a first end of the elongated tube such that the first locating portion and the second locating portion engage the internal bore of the elongated tube and center the end fitting with respect to the elongated tube. Adhesive is then injected into a generally annular adhesive receiving gap formed between the first locating portion, the second locating portion, the adhesive gap portion and the internal bore of the elongated tube to bond the end fitting to the tube. A second end fitting can also be bonded to an opposite end of the tube in a similar manner. In a preferred embodiment, the first and second locating portions provide an interference fit between the elongated tube and the end fitting to position the end fitting concentrically with the elongated tube and to maintain the positioning of the end fitting with respect to the elongated tube until the adhesive is cured.

In a preferred embodiment the end fitting is made of a high strength non-weldable aluminum alloy that is stronger than weldable aluminum alloys and the metal tube is made of a metal matrix composite aluminum.

Other objectives, features and advantages of the present invention can be discerned from the present description.

BRIEF DESCRIPTION OF THE DRAWINGS

FIG. 3 is an end elevational view of the drive shaft of FIG. 1;

FIG. 4 is an enlarged partial side sectional view of Detail B as shown in FIG. 2;

FIG. 5 is an enlarged partial side sectional view of Detail C as shown in FIG. 2;

FIG. 6 is a partial enlarged side sectional view of the drive shaft of FIG. 1;

FIG. 7 is a partial end sectional view as taken along view fine G-G of FIG. 1;

FIG. 8 is an enlarged partial side sectional view of a portion of FIG. 7;

FIG. 9 is similar to FIG. 1 but also shows a second fitting on a second side of the drive shaft; and FIG. 10 is a partial sectional view of an alternative embodiment.

DETAILED DESCRIPTION OF THE INVENTION

The present invention includes a method for bonding an end fitting to a drive shaft tube, without the use of welding. The present invention also includes the bonded drive shaft.

Figure 1:
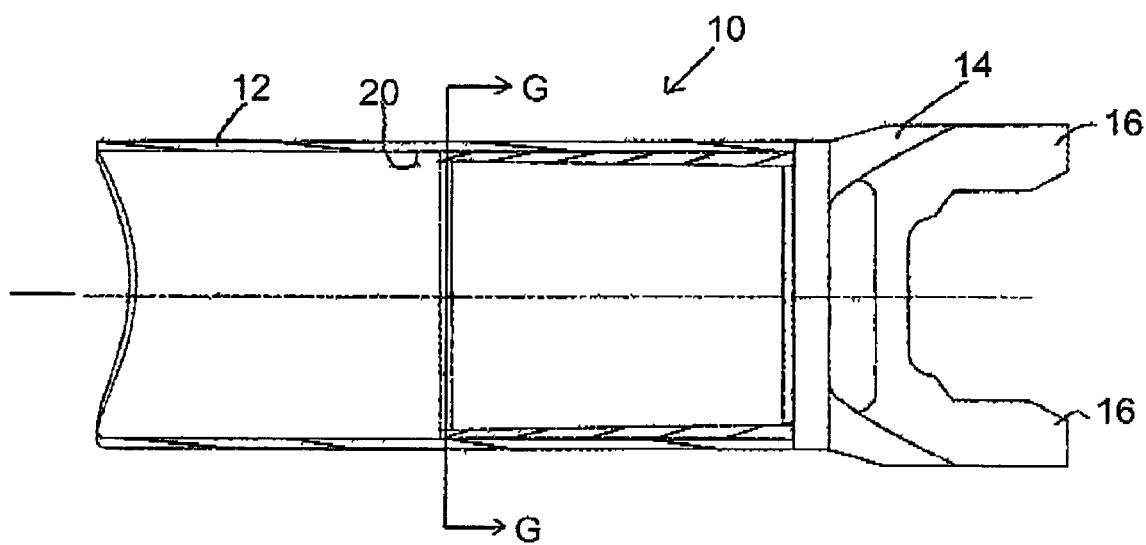
FIG. 1 is a partial side elevational phantom view of a drive shaft of the present invention.

In the present invention, a bonded drive shaft 10 includes a tube 12 and an end fitting (or yoke fitting) 14. The drive shaft 10 will normally include two end fittings 14 on opposite ends of the tube 12. A first end fitting 14 is shown in FIG. 1 and both the first end fitting 14 and a second end fitting 114 of the same shaft are shown in FIG. 9. The two end fittings 14 and 114 can be substantively identical or can be different, as the application warrants.

The tube 12 can be made of aluminum, steel, carbon fiber or other high strength material, alloy or composite. In one preferred embodiment, the tube is an extruded tube made from Duralcan Metal Matrix Composite Aluminum. The end fitting 14 includes bosses 16 for supporting a u-joint, as is known. The end fitting 14 can be made of aluminum, steel, carbon fiber or other high strength material, alloy or composite. In a preferred embodiment, the end fitting 14 is machined from a high strength non-weldable aluminum alloy that is significantly stronger than aluminum alloys that are weldable. Through the use of the present invention, such a non-weldable aluminum alloy can be used for the end fittings 14 of the drive shaft 10, as well as for the tube 12, and can provide a combination of increased strength and/or lighter weight as compared to components manufactured from weldable aluminum alloys.

Figure 2:
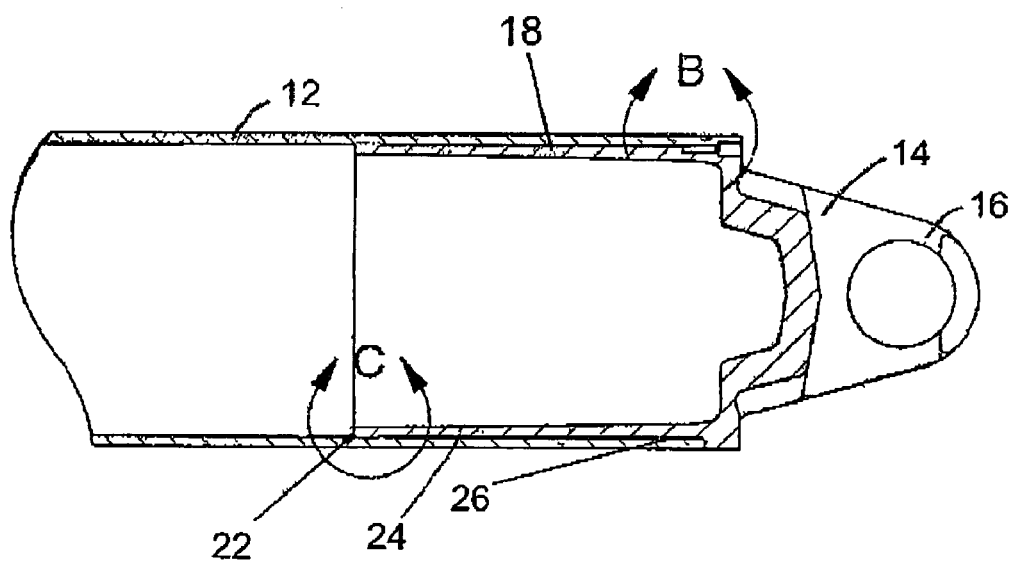
FIG. 2 is a partial side sectional view of the drive shaft of FIG. 1.

The end fitting 14 includes a tubular portion 18 that is constructed and arranged to fit into an internal bore 20 of the tube 12. The tubular portion includes a first locating portion 22, a second locating portion 26 and an adhesive gap portion 24 spaced between the two locating portions (see FIGS. 2 and 6). The locating portions 22 and 26 are dimensioned to provide a desired fit with the internal bore 20 of the tube 12. The fit can be adjusted as desired and need not be an interference fit, but in a preferred embodiment, an interference fit of approximately 0.002 inches is used. This interference fit accurately positions the end fitting 14 in the tube 12 and provides a light retention force to maintain this position of the end fitting 14 in the tube 12 until the end fitting 14 has been permanently bonded to the tube 12, as described below.

The adhesive gap portion 24 of the end fitting 14 has a smaller diameter than the flanking locating portions 22 and 26 and provides a space or adhesive receiving gap 25 between the end fitting 14 and the tube 12 to accommodate adhesive 28. In a preferred embodiment, the adhesive receiving gap 25 between the tube 12 and the adhesive gap portion 24 of the end fitting is 0.014 inches wide. This dimension can be varied as desired according to the type of adhesive used or for other reasons. The dimension need not be uniform along an axial length of die adhesive receiving gap but can varied to provide specific desired characteristics For instance, the dimension can be tapered from one end to the other where such an arrangement can provide improved bond characteristics. Because of the accurate positioning of the end fitting 14 in the tube 12 by the locating portions 22 and 26, the gap 25 for the adhesive 28 is perfectly concentric around the tube and has an exact, defined volume within which to inject adhesive. Because the tube can be supplied from the tube manufacturer in a finished state with a constant inside diameter and outside diameter, it is preferred in such an instance to have the locating portions and adhesive gap portion provided on the end fitting so that further machining operations on the tube are not required. However, the present invention is not limited to such an embodiment and the locating portions and/or adhesive gap portions can alternatively be provided on the tube 12 (See FIG. 9), or in another embodiment, the locating portions and adhesive gap portion can be divided between the tube and the end fitting. As seen in FIG. 9 adhesive receiving gap 125 is positioned on the tube 12 for receiving an adhesive. The tube 12 also includes locating portions 122 and 126 to accurately position the second end fitting 114 in the tube 12. FIG. 10 shows an alternative embodiment end twine 214 which combines various aspects of the two previously discussed embodiments. The end fitting 214 includes locating portion 26 for locating against tube 12 and locating portion 22 for locating against locating portion 122 of tube 12 to create adhesive receiving gap 225 therebetween.

The end fitting 14 further includes an injection port 30 into which the adhesive 28 can be injected. The injection port 30 passes through the second locating portion 26 into the adhesive receiving gap 25 and is preferably configured to accept an injection mechanism in an air-tight manner to inject adhesive 28 from the injection mechanism into the adhesive receiving gap 25. In a preferred embodiment, an injection syringe is used as the injection mechanism and the injection port has a diameter of 0.156 inches to snugly receive the injection syringe. Other configurations can be used to provide a sealed connection between an adhesive injection mechanism and the injection port 30.

An air bleed port 32 is positioned on the first locating portion 22 to allow air to bleed from the adhesive receiving gap 25 as adhesive is injected into the adhesive receiving gap 25. In a preferred embodiment, the air bleed port is positioned 180° away from the injection port 30 around the end fitting 14. This allows the adhesive to spread completely around the circumference of the end fitting 14 and tube 12 as it is injected into the adhesive receiving gap 25 to provide maximum surface contact and thus, maximum bond strength, between the adhesive 28, the end fitting 14 and the tube 12. This also helps maintain the balance of the drive shaft since the adhesive is uniformly spread around the circumference of the drive shaft 10. It has been found that when the air bleed port 32 is not positioned approximately 180° away from the injection port 30, the adhesive does not spread evenly around the circumference of the tube 12 and end fitting 14. However, the invention is not limited to such a 180° spacing. The air bleed port 32 can be sized as desired to provide proper air bleed during adhesive injection and additional air bleed ports with different positioning can also be provided if desired, as can additional injection ports. In one embodiment, an epoxy adhesive is used, although other types of adhesives can also be used.

The exact volume defined by the locating portions, the adhesive gap portion and the tube 12 is useful during the bonding process. Because this volume is known and exact, it is also known how much adhesive is required to fill the adhesive receiving gap 25. This prevents injecting too much adhesive into the adhesive receiving gap 25 that may then escape through the air bleed port 32, thereby wasting adhesive and potentially negatively affecting the balance of the drive shaft 10 due to a local accumulation of adhesive around the air bleed port 32.

In the method of the present invention, the end fitting 14 is inserted into the tube 12 with the locating portions providing an exact concentric positioning of the end fitting 14 with respect to the tube 12 and an exact volume to the adhesive receiving gap 25. The interference fit between the end fitting 14 and the tube 12 allows the drive shaft to be handled prior to full cure of the adhesive 28. The injection mechanism is connected to the injection port 30 and a predetermined amount of adhesive sufficient to fill the adhesive receiving gap 25 is injected into the adhesive receiving gap 25. Air is allowed to bleed from the adhesive receiving gap 25 during the injection process through an air bleed port 32 positioned approximately 180° away from the injection port 30 to provide uniform, controlled flow of the adhesive 28 around the circumference of the drive shaft 10. This maximizes surface contact between the adhesive 28, the tube 12 and the end fitting 14 and minimizes imbalance due to nonuniform flow of the adhesive 28. By predetermining the amount of injected adhesive 28 based on the volume of the adhesive receiving gap 25, excess adhesive is not injected into the drive shaft, which otherwise could flow through the air bleed port 32 and accumulate in one position, thereby potentially affecting the balance of the drive shaft.

If desired, the drive shaft can be rotated, about any axis, to aid the flow of the adhesive through centrifugal force, though this has not been found to be necessary. It has been found that placing the drive shaft 10 in an orientation such that the injection port 30 is lower than the air bleed port 32 during the adhesive injection process can help air pockets and air bubbles to flow upward and out through the air bleed port 32, resulting in a more complete adhesive fill in the adhesive receiving gap 25. During the adhesive injection process, the injection pressure on the adhesive through the injection port 30 can be maintained for a period of time after the last portion of the adhesive 28 has been injected into the adhesive receiving gap 25 to assist the adhesive in uniformly flowing throughout the adhesive receiving gap 25 and to prevent any back flow of adhesive 28 through the injection port 30. The pressure hold period assists in the air bleeding process by providing additional time for trapped air to escape through the air bleed port. This pressure hold time can vary from a few seconds to over an hour but is preferably at least 5-10 minutes. Because of the interference fit between the end fitting 14 and the tube 12, the drive shaft can then be balanced prior to full curing of the adhesive 28, which full curing can take several hours. This aids in the efficiency of producing the bonded drive shafts.

It has been found that pretreating the tube 12 and end fittings prior to the bonding process can improve the strength of the adhesive bond. In a preferred method, the end fitting is first media blasted (blasted with sand or another media) to provide a roughened surface texture that increases the bond of the adhesive. The end fitting is then ultrasonically cleaned to remove contaminates and then chromated. The chromate layer increases the bond strength of the adhesive to the end fitting. The end fitting is then rinsed in distilled or deionized water and dried before positioning the end fitting 14 in the tube 12. The same process is also preferably used on the interior of the tube to increase the strength of the adhesive bond with respect to the tube 12. Other surface treatments on the end fitting 14 and/or tube 12 can also be used.

The various features described herein can be combined in different combinations to create different embodiments within the scope of the invention.

The present invention provides for one or more of the following features:

1. Higher strength non-weldable materials can be used, since there is no welding of such components.

2. By utilizing the metal matrix composite aluminum for the tubular structure the shaft critical speed is increased by 22% compared to steel or 6061-T6 aluminum tubing.

3. The bonding allows the shaft to have the full strength of the selected materials, as there is no annealing (and loss of strength) due to the softening that occurs during the welding process.

4. Since there is no welding, there is no distortion due to welding which would negatively affect the accuracy and run-out provided by the mechanical alignment by the locating portions and the resulting mechanical mating.

5. The locating portions on one of the components provide a controlled constant gap for the adhesive bond line.

6. The method uses an injection hole for adhesive with an opposed end air bleed hole to allow a substantially 100% fill with a precisely controlled volume of adhesive.

7. The mechanical press fit of the locating portions allow the drive shaft to be handled, and other mechanical components installed and balanced, without waiting for the full adhesive cure period.

8. The balance characteristics are much improved and require less weight for balancing, as a result of the concentric improvements inherent to the bonding process.

What is claimed is:

1. A bonded drive shaft, comprising:
an elongated tube including an internal bore;
at least one end fitting, the end fitting including a portion for connecting to a drive component and an elongated tubular portion positioned in the internal bore of a first end of the elongated tube, the elongated tubular portion including a first locating portion distant from the connecting portion, a second locating portion proximal to the connecting portion and an adhesive gap portion positioned between the first locating portion and the second locating portion, the first locating portion and the second locating portion having outer diameters such that they engage the internal bore of the elongated tube and center the end fitting with respect to the elongated tube, the adhesive gap portion having an external diameter such that a generally annular adhesive receiving gap is formed between the first locating portion, the second locating portion, the adhesive gap portion and the internal bore of the elongated tube; and
adhesive positioned in the adhesive receiving gap to bond the end fitting to the elongated tube;
wherein:
the end fitting further comprises an injection port extending from an exterior of the end fitting co the adhesive receiving gap for injecting adhesive into the adhesive receiving gap;
the end fitting includes an air bleed port positioned on the first locating portion axially distally from the injection port, the air bleed port connecting between the adhesive receiving gap and a portion of the internal bore of the elongated tube axially inward from the end fitting;
the air bleed port is also positioned approximately 180° around a circumference of the end fitting from the injection port.

2. The bonded drive shaft of claim 1, wherein the first locating portion and the second locating portion of the end fitting have an interference fit with the internal bore of the elongated tube.

3. The bonded drive shaft of claim 2, wherein the elongated tube is constructed of a metal matrix composite aluminum.

4. The bonded drive shaft of claim 3, wherein the adhesive is an epoxy adhesive.

5. The bonded drive shaft of claim 4, and further comprising a second end fitting like the first end fitting, the second end fitting positioned in the internal bore at a second end of the elongated tube and bonded to the elongated tube with adhesive.

6. The bonded drive shaft of claim 2, and further comprising a second end fitting like the first end fitting, the second end fitting positioned in the internal bore at a second end of the elongated tube and bonded to the elongated tube with adhesive.

7. The bonded drive shaft of claim 2 wherein the end fitting is chromated prior to assembling to the tube.

8. The bonded drive shaft of claim 1, wherein the elongated tube is constructed of a metal matrix composite aluminum.

9. The bonded drive shaft of claim 1, wherein the end fitting is constructed of a non-weldable aluminum alloy.

10. The bonded drive shaft of claim 1, wherein the end fitting has a chromate coating at least on the adhesive gap portion.

11. The bonded drive shaft of claim 1, wherein the elongated tube has a chromate coating at least on the portion of the internal bore bonded to the end fitting.

12. A bonded drive shaft, comprising:
an elongated tube including an internal bore;
at least one end fitting, the end fitting including a portion for connecting to a drive component and an elongated tubular portion positioned in the internal bore of a first end of the elongated rube;
at least one of the elongated tubular portion of the end fitting and the elongated tube including a first locating portion distant from the connecting portion, a second locating portion proximal to the connecting portion and an adhesive gap portion positioned between the first locating portion and the second locating portion, the first locating portion and the second locating portion having diameters such that they engage the other of the elongated tubular portion of the end fitting and the elongated tube to position the end fitting with respect to the tube;

the adhesive gap portion having an external diameter such that a generally annular adhesive receiving gap is formed between the first locating portion, the second locating portion, the end fitting and the elongated tube; and adhesive positioned in the adhesive receiving gap to bond the end fitting to the elongated tube;

wherein:

at least one of the end fitting and the tube further comprises an injection port extending from an exterior to the adhesive receiving gap for injecting adhesive into the adhesive receiving gap;

the end fitting includes an air bleed port connected to the adhesive receiving gap and positioned on/adjacent the first locating portion axially distally from the injection port, the air bleed port connecting between the adhesive receiving gap and a portion of the internal bore of the elongated tube axially inward from the end fitting;

the air bleed port is also positioned approximately 180° around a circumference of the drive shaft from the injection port.

13. The bonded drive shaft of claim 12, wherein the first locating portion, second locating portion and adhesive gap portion are located on the elongated tube.

14. The bonded drive shaft of claim 12, wherein at least one of the first locating portion, second locating portion and adhesive gap portion are located on the elongated tube and at least another of the first locating portion, second locating portion and adhesive gap portion are located on the end fitting.

15. The bonded drive shaft of claim 12, wherein the first locating portion and the second locating portion provide an interference fit wit the end fitting.

16. The bonded drive shaft of claim 15, wherein the elongated tube is constructed of a metal matrix composite aluminum.

17. The bonded drive shaft of claim 12, and further comprising a second end fitting like the first end fitting, the second end fitting positioned in the internal bore at a second end of the elongated tube and bonded to the elongated tube with adhesive.

18. The bonded drive shaft of claim 12, wherein the end fitting is eliminated prior to assembling to the tube.

19. The bonded drive shaft of claim 12, wherein the end fitting is constructed of a non-weldable aluminum alloy.

20. The bonded drive shaft of claim 12, wherein the end fitting has a chromate coating at least on the adhesive gap portion.

21. The bonded drive shaft of claim 12, wherein the elongated tube has a chromate coating at least on the portion of the internal bore bonded to the end fitting.

* * * * *